Nov. 12, 1940.          D. V. WATERS          2,220,983
APPARATUS FOR POWER FLOW CONTROL
Filed June 3, 1939
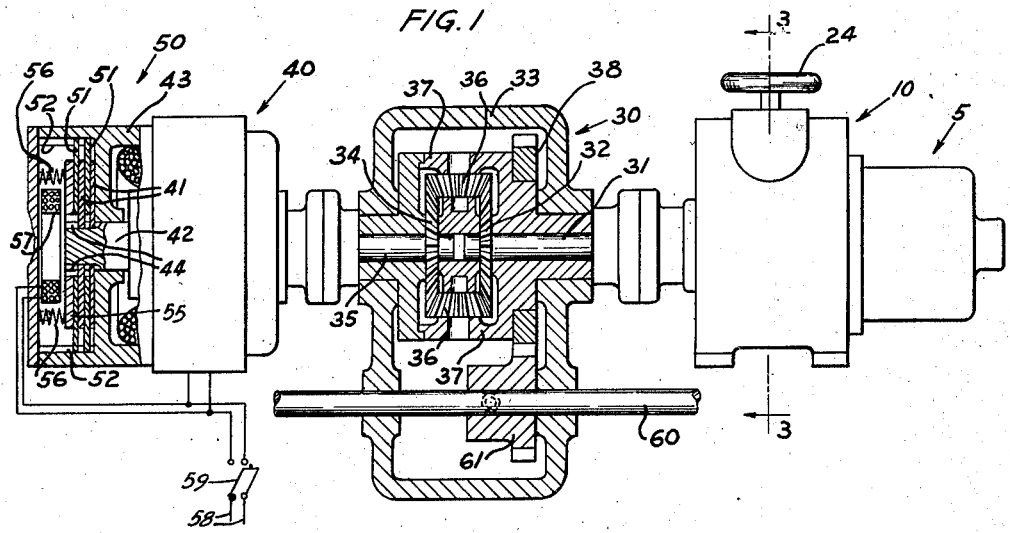
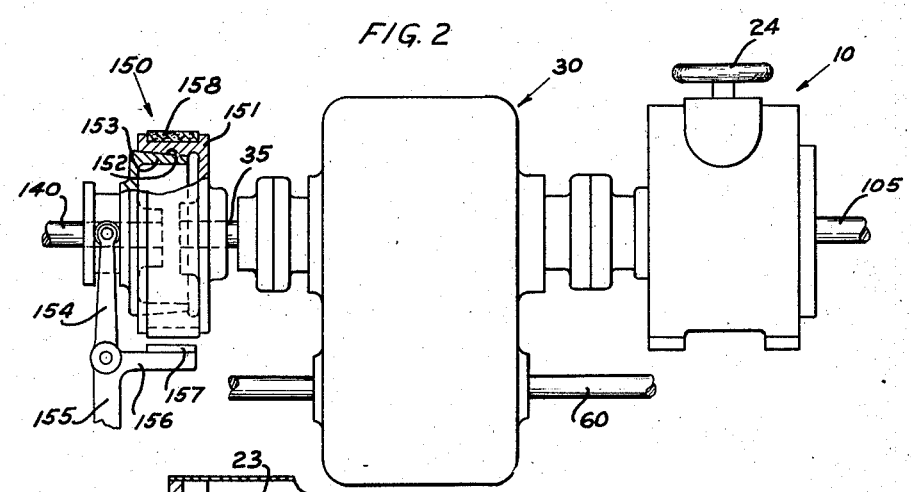
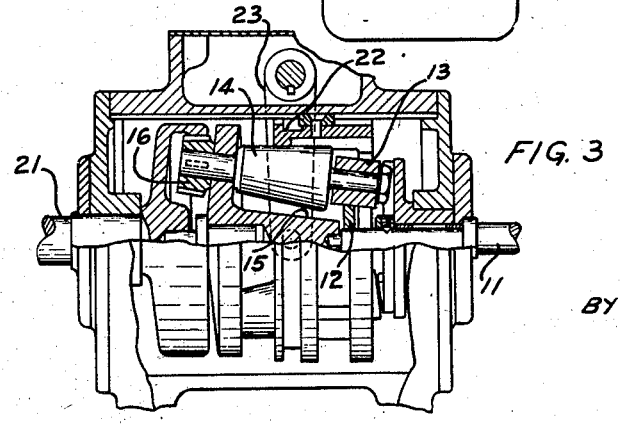
INVENTOR
D. V. WATERS
BY E. R. Nowlan
ATTORNEY Patented Nov. 12, 1940

2,220,983

UNITED STATES PATENT OFFICE 2,220,983

APPARATUS FOR POWER FLOW CONTROL

Daniel V. Waters, South Orange, N. J., assignor to Western Electric Company, Incorporated, New York, N. Y., a corporation of New York Application June 3, 1939, Serial No. 277,142

6 Claims. (Cl. 74—282)

This invention relates to an apparatus for power flow control, and more particularly to such an apparatus having an unusually wide range of values for the ratio of input speed to output speed.

With the increasing development in industry of complex mechanisms for performing many kinds of production operations and sequences of such operations it is becoming in many instances increasingly important, in order that similar products of a relatively wide range of dimensions may be handled on a single apparatus, to provide a wide range of adjustability of the apparatus; and such will in some cases include the need for means to adjustably vary the relative speeds of two moving elements of an apparatus. In such a case the adaptability of an apparatus to a wide range of similar products of differing dimensions may be limited by the capacity for adjustability of a variable speed transmission in the mechanism, without either loss or waste of power. For example, the cabling machines used for making electrical conductor cables are very large and costly, and considerable economy can be achieved if such a machine can be used for a large variety of kinds and sizes of cable. This, however, necessitates an equally large range of operating speeds for the machine.

An object of the present invention is to provide an apparatus for power flow control which shall be effective to operate over a relatively very large range of values of the ratio of input to output, and which shall be reliable and simple in operation and structure.

One embodiment of the invention may present a constant speed power source driving an adjustably variable speed transmission which in turn drives one of the two input members of a differential gear of planetary type, and a second constant speed power source driving the other input member of the differential device through a combination clutch and brake means.

Other objects and features will appear from the following detailed description of one embodiment thereof taken in connection with the accompanying drawing in which the same reference numerals are applied to identical parts in the several figures and in which:

Fig. 1 is a partially diagrammatic view of a variable speed transmission constructed in accordance with the invention;

Fig. 2 is a similar view of a modified form; and

Fig. 3 is a section on the line 3—3 of Fig. 1.

The embodiment disclosed in Fig. 1 presents a combination of coacting units, viz. a constant speed electric motor 5, which drives the input shaft of a variable transmission device of well known type generally indicated at 10. The output shaft of this device 10 drives one side of a planetary differential gearing generally indicated at 30. The other side of the gearing 30 is driven by a constant speed electric motor 40 which also is connected to a spring-set magnetic brake generally indicated at 50. The spider of the differential 30 is geared to an output shaft 60.

There is nothing to require specific description of either of the motors 5 and 40, as there are various well known types of constant speed electric motors suitable for this use.

The device 10, generally speaking, may be any one of several types of well known adjustably variable speed transmission mechanisms. The one selected for illustration here and shown in principle in Fig. 3 is that commercially known as the Graham variable speed transmission.

In the device 10, shown in principle in Fig. 3, the input shaft 11, which in Fig. 1 is coupled to and driven by the motor 5, carries a cam 12 having the general form of a circular disk with one or more flat places on its periphery. A plurality of identically similar sleeves 13 rest respectively on the flat places of the cam 12. In each of these sleeves 13 is journalled one end of one of a plurality of friction cones 14, equispaced about the axial line of the shaft 11, and having their other ends journalled in a freely rotatable spider 15. Beyond these last journals each cone has an integral or rigidly attached pinion 16. All the pinions 16 mesh with an encircling internal ring gear 19 integral with or rigidly secured to the output shaft 21 of the device. A friction ring 22 encircles and is engaged by the several friction cones 14. The ring 22 is mounted in the housing of the device to be slidable but not rotatable therein and can be shifted longitudinally of the cones 14 by the yoke 23 as adjustable by means of the handle 24. When the shaft 11 exerts torque on the cam 12, the latter first tends to force the sleeves 13 radially away from the center. The ring 22 prevents this motion. Hence the cam drives the sleeves 13 and the cones 14 and the spider 15 in revolution about their common axis and at the same time forces the cones against the ring 22. The cones therefore roll on the friction ring and their pinions 16 drive the gear 19 and therewith the output shaft 21 at a speed dependent upon the position of the ring 22 along the cones 14.

The principal elements of the planetary gearing gearing 30 are shown in Fig. 1. The shaft 31 is driven by the output shaft of the device 10 and has a main gear 32 rigidly secured thereto. The other main gear 34 is rigidly secured on the shaft 35 which is driven by the motor 40. A plurality of planetary gears 36 engages both gears 32 and 34 and is mounted on a spider 37 freely rotatable on the shafts 31 and 35. A gear 38 rigidly secured to the spider drives the output shaft 60 through a gear 61 thereon. Conveniently the housing 33 of the differential will also house the gear 61.

The magnetic brake 50 is conveniently housed within an extension of the housing 43 of the motor 40 and mounted in part on the rotor shaft 42 of the motor. This brake 50 comprises essentially two intercalated sets of friction disks, of which the disks 51 are mounted in the housing 43 to be slidable therein along the axis of the shaft 42 but are held against rotation, as by keys 52. The other set of disks 41, intercalated with the disks 51, is individually slidable longitudinally on the shaft 42 and keyed thereto against rotation as by keys 44. A pressure ring 55 of magnetic material is secured to the left face of the leftmost friction ring and is urged to the right by compression springs 56. A solenoid or electromagnet 57 is sufficiently powerful when energized to draw the ring 55 to the left against the springs 56. The solenoid is connected across two of the power input leads 58 of the motor 40. Thus, whenever power is being supplied to the motor 40, the brake 50 is rendered ineffective; and, whenever the motor 40 is not being energized, the brake 50 will anchor it against rotation. A switch 59 serves to simultaneously energize or deenergize both the solenoid 57 and the motor 40.

In the modified form shown in Fig. 2, the motors 5 and 40 and the magnetic brake 50 are omitted. Two constant speed shafts 105 and 140 are used instead to supply power to the apparatus, these shafts being driven by any suitable means (not shown). The shaft 105 is then coupled to the input shaft of the device 10 either directly or in any suitable manner. The elements 10, 30 and 60 and their connections and relations are as before. On the shaft 35 of the differential 30, there is mounted a combination clutch and brake drum 151, whose inside flange surface is formed as one member 152 of a cone clutch whose other member 153 is mounted to be slidable on but to rotate with the shaft 140, being shifted into and out of engagement with the member 152 by means of the yoke lever arm 154 of the lever 155. The lever 155 also has a horizontal arm 156 proportioned to stand adjacent the outer flange face of the drum 151, and carrying a brake shoe 157 which engages a peripheral brake member 158 on the flange of the drum 151 when the clutch members 152 and 153 are disengaged and is disengaged from the brake member 158 when the clutch is engaged. Thus the device generally indicated at 150 plays substantially the same role in Fig. 2 as does the device 50 in Fig. 1.

To illustrate the operation, let it be assumed that both motors 5 and 40 in Fig. 1, or both shafts 105 and 140 in Fig. 2, are running at constant speed and that the unit 10 in either case is adjusted by means of the handle 24 to give maximum output on the shaft 21. Let it further be assumed that these elements are so proportioned and driven that the two shafts 31 and 35 are running at equal speeds and in the same direction. The pinions 36 then do not rotate but revolve bodily and carry the spider or cage 37 at the same speed as the shafts 31 and 35, and so drive the gear 38 and hence the gear 61 and the shaft 60 at maximum speed. If now the device 10 be adjusted to drive the shaft 31 more slowly while the shaft 35 is to run at the same speed as before, the spider 37 and hence the gear 38 will run at a speed half-way between those of the shafts 31 and 35. Since a variable transmission such as 10 may be adjusted smoothly to deliver from its maximum to zero speed at the shaft 31, such adjustment permits of adjusting the speed of the gear 38 and hence of the shaft 60 to any value between its maximum and half its maximum.

To cover the range from half maximum speed, the motor 40 is stopped or the clutch 152, 153 is disengaged, and the shaft 35 is locked to be stationary by means of the magnetic brake 50 or the brake 157, 158; and the device 10 is adjusted to deliver maximum speed at the shaft 31. The shaft 60 is then driven at half maximum speed. Any speed intermediate between this and zero then can be obtained by adjusting the device 10 as before. Thus with both motors 5 and 40 running or both shafts 105 and 140 running and coupled, any speed of the shaft 60 from maximum to one half maximum can be obtained by adjustment at 24; and with the motor 40 stopped or the shaft 140 uncoupled and the shaft 35 locked, any speed from one half maximum to zero can be obtained by adjustment at 24.

Now the maximum power transmitted through the device 10 in any position of adjustment is that of the motor 5 or of the shaft 105; while the maximum power delivered to the shaft 60 is that of both motors added together. This is the case when the device 10 is adjusted to deliver maximum speed at the shaft 31 and both shafts 31 and 35 are being driven. Hence the device 10 is never called upon to carry more than half of the maximum power transmitted, since preferably the power capacity of the two motors is the same. This is a point of much importance, for the bulk, mass and inertia of a variable speed device such as 10 or an equivalent thereof which depends upon a continuously variable friction device for its function, increase more rapidly than in direct proportion as its power transmitting capacity is increased. Roughly speaking, the bulk and mass of the unit 10 and its parts will be much less than half of that needed were all the maximum power required to be delivered through it.

It will be evident that, if desired, the output shaft of the device 10 may be coupled to the shaft 60 instead of to the shaft 31, in which case the shaft 31 becomes the output shaft of the apparatus. Similarly by coupling the motor 40 to the shaft 60 instead of to the shaft 35, the shaft 35 may be made the output shaft of the apparatus.

It is important to note that whenever the apparatus is in operation, the motor 5 or the shaft 105 is always running at full and unvarying speed, while the motor 40 or the clutch member 151 is either totally stationary or is also running at top and unvarying speed. No power is wasted at any time by running either motor at less than its normal rate.

The embodiments disclosed are illustrative and may be modified and departed from in various ways without departing from the spirit and scope of the invention as pointed out in and limited solely by the appended claims.

What is claimed is:

1. A power flow control apparatus comprising a differential gearing unit having two power input members and one power output member, an adjustably variable speed power transmission means coupled to one of the power input members to drive the same, a constant speed power supply means coupled to the variable transmission means to drive the same at constant speed and thereby the input member coupled thereto at an adjustably variable and otherwise constant speed, a second constant speed power supply means, a locking means, and means to alternatively cause the second power input member of the differential gearing unit to be driven by the second power supply means at the full constant speed thereof or to be held stationary by the locking means.

2. A power flow control apparatus comprising a differential gearing unit having two power input members and one power output member, an adjustably variable speed power transmission means coupled to one of the power input members to drive the same, a constant speed power supply means coupled to the variable transmission means to drive the same at constant speed and thereby the input member coupled thereto at an adjustably variable and otherwise constant speed, a constant speed electric motor coupled to the second power input member of the differential gearing unit to drive the same at the full constant speed of the motor, and an electromagnetic locking means also coupled to the second power input member to hold the same stationary, the said electromagnetic locking means being electrically connected to the electrical power supply circuit of the motor so that when the motor is energized to drive the input member the locking means is inhibited to act and when the motor is not energized the locking means is effective.

3. A power flow control apparatus comprising a differential gearing unit having two power input members and one power output member, an adjustably variable speed power transmission means coupled to one of the power input members to drive the same, a constant speed power supply means coupled to the variable transmission means to drive the same at constant speed and thereby the input member coupled thereto at an adjustably variable and otherwise constant speed, a second constant speed power supply means, a stationary locking member, and means to alternatively couple the second power input member of the differential gearing to the second power supply means to be driven thereby at constant speed while uncoupling the input from the stationary locking member or to uncouple the said input member from the said power supply means while coupling the said input member to the stationary locking member to be held stationary thereby.

4. A power flow control apparatus comprising a differential gearing unit having two power input members and one power output member, an adjustable variable speed power transmission means coupled to one of the power input members to drive the same, a constant speed power supply means coupled to the variable transmission means to drive the same at constant speed and thereby the input member coupled thereto at an adjustably variable and otherwise constant speed, a second constant speed power supply means substantially equal in power and speed to the first power supply means, a locking means, and means to alternatively cause the second power input member of the differential gearing unit to be driven by the second power supply means at the full constant speed thereof or to be held stationary by the locking means.

5. A power flow control apparatus comprising a differential gearing unit having two power input members and one power output member, an adjustably variable speed power transmission means coupled to one of the power input members to drive the same, a constant speed power supply means coupled to the variable transmission means to drive the same at constant speed and thereby the input member coupled thereto at an adjustably variable and otherwise constant speed, a constant speed electric motor coupled to the second power input member of the differential gearing unit to drive the same at the full constant speed of the motor and substantially equal in power and speed to the said power supply means, and an electromagnetic locking means also coupled to the second power input member to hold the same stationary, the said electromagnetic locking means being electrically connected to the electrical power supply circuit of the motor so that when the motor is energized to drive the input member the locking means is inhibited to act and when the motor is not energized the locking means is effective.

6. A power flow control apparatus comprising a differential gearing unit having two power input members and one power output member, an adjustably variable speed power transmission means coupled to one of the power input members to drive the same, a constant speed power supply means coupled to the variable transmission means to drive the same at constant speed and thereby the input member coupled thereto at an adjustably variable and otherwise constant speed, a second constant speed power supply means substantially equal in power and speed to the first power supply means, a stationary locking member, and double acting clutch and brake means to alternatively couple the second power input member of the differential gearing to the second power supply means to be driven thereby at constant speed while uncoupling the input from the stationary locking member or to uncouple the said input member from the said power supply means while coupling the said input member to the stationary locking member to be held stationary thereby.

DANIEL V. WATERS.